US010497133B2

(12) United States Patent
Aizawa (10) Patent No.: US 10,497,133 B2
(45) Date of Patent: Dec. 3, 2019

(54) OBJECT TRACKING APPARATUS AND OBJECT TRACKING METHOD

(71) Applicant: OMRON Corporation, Kyoto-shi, Kyoto (JP)

(72) Inventor: Tomoyoshi Aizawa, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/756,084

(22) PCT Filed: Feb. 27, 2017

(86) PCT No.: PCT/JP2017/007312
§ 371 (c)(1),
(2) Date: Feb. 28, 2018

(87) PCT Pub. No.: WO2018/008184
PCT Pub. Date: Jan. 11, 2018

(65) Prior Publication Data
US 2019/0114788 A1 Apr. 18, 2019

(30) Foreign Application Priority Data

Jul. 8, 2016 (JP) .................................. 2016-136130

(51) Int. Cl.
*G06T 7/246* (2017.01)
*G06T 7/231* (2017.01)
*G08G 1/04* (2006.01)

(52) U.S. Cl.
CPC .............. *G06T 7/248* (2017.01); *G06T 7/231* (2017.01); *G08G 1/04* (2013.01); *G06T 2207/10016* (2013.01); *G06T 2207/30252* (2013.01)

(58) Field of Classification Search
CPC . G06T 2207/10016; G06T 2207/30252; G06T 7/20; G06T 7/231; G06T 7/248; G08G 1/04
See application file for complete search history.

(56) References Cited

U.S. PATENT DOCUMENTS 6,687,386 B1 * 2/2004 Ito ...................... G06K 9/00785
382/103
2008/0317289 A1 12/2008 Oyaizu
2015/0206004 A1 7/2015 Liang et al.

FOREIGN PATENT DOCUMENTS

JP 2001-60269 A 3/2001
JP 2006-178669 A 7/2006
(Continued)

OTHER PUBLICATIONS

Zhao, Tao, and Ram Nevatia. "Tracking multiple humans in complex situations." IEEE Transactions on Pattern Analysis & Machine Intelligence 9 (2004): 1208-1221. (Year: 2004).*
(Continued)

*Primary Examiner* — Nirav G Patel
(74) *Attorney, Agent, or Firm* — Metrolex IP Law Group, PLLC (57) ABSTRACT

An image processing apparatus tracks a target object included in a plurality of consecutively captured images. The image processing apparatus may include an image acquisition unit, a template acquisition unit, a masking map generation unit, and a tracking unit. The image acquisition unit acquires the image. The template acquisition unit acquires a template corresponding to the target object. The masking map generation unit generates a masking map that indicates a degree of masking of the target object by another object. The tracking unit detects the target object by using the template, and acquires an amount of movement of the
(Continued)

target object and a direction of the movement of the target object, based on both of the template and the masking map.

8 Claims, 9 Drawing Sheets

(56) References Cited

FOREIGN PATENT DOCUMENTS

| | | |
|---|---|---|
| JP | 2008-42659 A | 2/2008 |
| JP | 2008-192060 A | 8/2008 |
| JP | 2009-48428 A | 3/2009 |
| JP | 2009-87316 A | 4/2009 |
| JP | 2009-199417 A | 9/2009 |
| JP | 2015-138554 A | 7/2015 |
| JP | 2016-58085 A | 4/2016 |

OTHER PUBLICATIONS

An English translation of the International Search Report of PCT/JP2017/007312 dated Apr. 25, 2017.
An English translation of the Written Opinion of PCT/JP2017/007312 dated Apr. 25, 2017.
The Japanese Office Action dated Apr. 17, 2018 in a counterpart Japanese Patent application.

* cited by examiner

OBJECT TRACKING APPARATUS AND OBJECT TRACKING METHOD

TECHNICAL FIELD

The present invention relates to a technique for tracking an object included in consecutive frames.

BACKGROUND ART

In a monitoring system or the like, there is known a technique for detecting an object included in an image and automatically tracking the movement of the object. The tracking of the object can be implemented by, e.g., acquiring a difference between an image that does not include a target object to be tracked and an image that includes the target object to be tracked to generate a template, and searching the image frame by frame by using the template (PTL 1).

As a system to which the tracking of the object is applied, a traffic flow measurement system is known. It is possible to count the number of vehicles having passed a target point by shooting a video of a road by using, e.g., a camera installed on the roadside and tracking passing vehicles (PTL 2).

CITATION LIST

Patent Literature

[PTL 1] Japanese Patent Application Publication No. 2001-060269
[PTL 2] Japanese Patent Application Publication No. 2009-087316

SUMMARY OF INVENTION

Technical Problem

When a vehicle passing on a road is tracked based on the image (video) of the road, there are cases where masking becomes a problem. For example, when a distance between vehicles is short, there are cases where the vehicles overlap each other on the image. In addition, there are cases where vehicles in adjacent lanes overlap each other due to a lane change or the like. Thus, when part of a target vehicle to be tracked is masked by another object (a vehicle or the like), a problem arises in that accuracy in template matching is significantly reduced.

In the invention described in PTL 1, by performing matching by using a plurality of templates acquired at different times and using the template having the highest degree of matching, a reduction in tracking accuracy is prevented. However, in the case where a vehicle on a road is tracked, there are cases where the target vehicle to be tracked is widely masked by a vehicle in front or behind and, in these cases, it is not possible to maintain the accuracy by this method.

The invention described in PTL 2 adopts a method in which a possibility that tracking is correctly performed is verified after vehicles on a road are individually tracked, and the final result is determined based on the possibility. However, in the case where a target vehicle is widely masked or the case where a plurality of vehicles exhibit complicated behavior, it is not possible to maintain the accuracy similarly.

The present invention has been made in view of the above problem, and an object thereof is to improve accuracy in tracking in the case where part of a target object to be tracked is masked in an image processing device for tracking an object.

Solution to Problem

The present invention in its one aspect provides an image processing device for tracking a target object to be tracked included in a plurality of consecutively captured images, the image processing device comprising an image acquisition unit configured to acquire an image; a template acquisition unit configured to acquire a template corresponding to a target object to be tracked included in the image; a masking map generation unit configured to generate a masking map serving as a map indicative of a degree of masking the target object to be tracked, which is included in the image, by another object; and a tracking unit configured to detect the target object to be tracked included in the image by using the template, and acquire over a plurality of images an amount of movement of the target object to be tracked and a direction of the movement of the target object to be tracked, based on both of the template and the masking map.

The image processing device according to the present invention is the apparatus for tracking the movement of the target object to be tracked between a plurality of frames. Note that the movement denotes movement on the image, and the movement can occur due to the movement of the target object to be tracked and the change of shooting conditions (pan, tilt, and zoom of a camera).

The template acquisition unit is the unit configured to acquire the template corresponding to the target object to be tracked. The template may be a feature amount of the target object to be tracked, and may also be an image of the target object to be tracked. For example, in the case where a vehicle is tracked, the feature amount of each vehicle type (e.g., a passenger car, a truck, a bus, or a motorcycle) may be used and, in the case where the result of previous tracking is present, the image cut out based on the tracking result may be used.

The masking map generation unit is the unit configured to generate the map (masking map) indicative of the degree of masking of the target object to be tracked by another object. The masking map may be the map in which an area corresponding to the target object to be tracked is divided into a plurality of blocks. In addition, the masking degree may be represented by using an unlimited number of levels.

In addition, the tracking unit is the unit configured to track the target object to be tracked included in the acquired image over a plurality of consecutively acquired frames. In the present invention, the tracking unit tracks the movement of the target object to be tracked between the frames by using not only the template corresponding to the target object to be tracked but also the masking map. In the case where part of the target object to be tracked is masked, accuracy in tracking by matching is reduced in accordance with the ratio of the masking, but it becomes possible to perform the matching in consideration of the masking by another object by using the masking map, and the accuracy in tracking is improved.

Also, the masking map may be a map in which the template is divided into a plurality of blocks and the degree of masking is associated with each of the blocks, and the tracking unit may acquire the amount of the movement of the target object to be tracked and the direction of the movement of the target object to be tracked based on a result of matching performed by using the template on a per block basis and weighting performed by using the degree of masking corresponding to each of the blocks.

By performing the weighting on a matching result based on the masking degree of each block, it is possible to acquire an area to which the target object to be tracked has moved with high accuracy while reducing the effect of the masked block.

Also, the masking map generation unit may generate the masking map, based on a result of a comparison between a single vector, obtained by tracking the target object to be tracked over the plurality of images, and each of a plurality of vectors obtained by tracking the plurality of blocks over the plurality of images.

It is possible to generate the masking condition of the target object to be tracked by comparing "the single vector corresponding to the entire target object to be tracked" with "the plurality of vectors corresponding to the plurality of blocks constituting the target object to be tracked on a one-to-one basis". In the case where the masking occurs in one block, the accuracy in tracking over the frames is reduced in the block (or the tracking results in failure). Therefore, it is possible to calculate the masking degree in the block based on a displacement between the vectors.

Also, the masking map generation unit may set the degree of masking a corresponding block to a higher degree of masking as a difference between the single vector and each of the plurality of vectors resulting from the comparison between the single vector and each of the plurality of vectors is larger, and the tracking unit may set, as the degree of masking corresponding to a block is higher, a weight of the block to a smaller weight.

Also, the masking map generation unit may update the masking map every time the tracking unit generates a tracking result, and the tracking unit may use the updated masking map in a process of detecting the target object to be tracked in a next frame.

The masking condition of the target object to be tracked changes depending on the frame. Therefore, the masking condition of the target object to be tracked in the previous frame may be used in the tracking in the next frame. With this, it is possible to cope with the case where the masking condition changes ceaselessly.

Also, the degree of masking set in the masking map may be lower as an edge perpendicular to the movement direction of the target object to be tracked in a corresponding block is stronger.

In the case where the target object to be tracked moves in a specific direction, and a strong edge perpendicular to the movement direction is observed, it can be presumed that the target object to be tracked is not masked. Therefore, the masking map may be corrected by using the strength of the edge.

Also, the template acquisition unit may use an image obtained by clipping the target object to be tracked, which has been detected by the tracking unit, as the template in the next frame.

In the case where the result of detection of the target object to be tracked is present, an image serving as the template may be acquired based on the result, and the image may be used in the next frame. According to the configuration described above, even in the case where the size or orientation of the target object to be tracked gradually changes with the passage of time, it is possible to track the target object to be tracked accurately.

Note that the present invention can be viewed as an image processing device that includes at least part of the above units. In addition, the present invention can also be viewed as an image processing method executed by the above image processing device. Further, the present invention can also be viewed as a program that causes a computer to execute the above image processing method. The above processes and units can be arbitrarily combined and implemented as long as no technical conflicts occur.

Advantageous Effects of Invention

According to the present invention, in the image processing device for tracking the object, it is possible to improve the accuracy in tracking in the case where part of the target object to be tracked is masked.

DESCRIPTION OF EMBODIMENTS

First Embodiment

<System Configuration>

Hereinbelow, preferred embodiments of the present invention will be described with reference to the drawings.

An image processing system according to the present embodiment is a system that consecutively acquires images of a vehicle traveling on a road, and tracks the movement of the vehicle based on a plurality of the acquired images.

Figure 1:
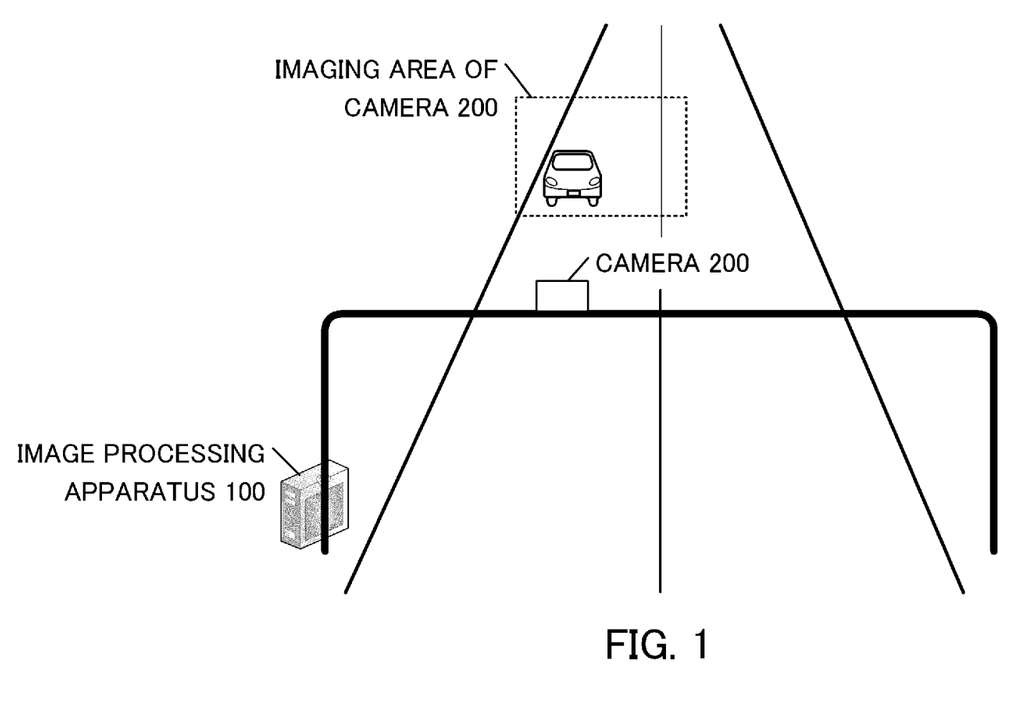
FIG. 1 is a layout of an image processing system according to a first embodiment.

FIG. 1 is a layout of the image processing system according to the present embodiment. The image processing system according to the present embodiment includes an image processing apparatus 100 and a camera 200, and the image processing apparatus 100 processes a plurality of images consecutively captured by the camera 200 disposed on a road to track the movement of a vehicle.

Figure 2:
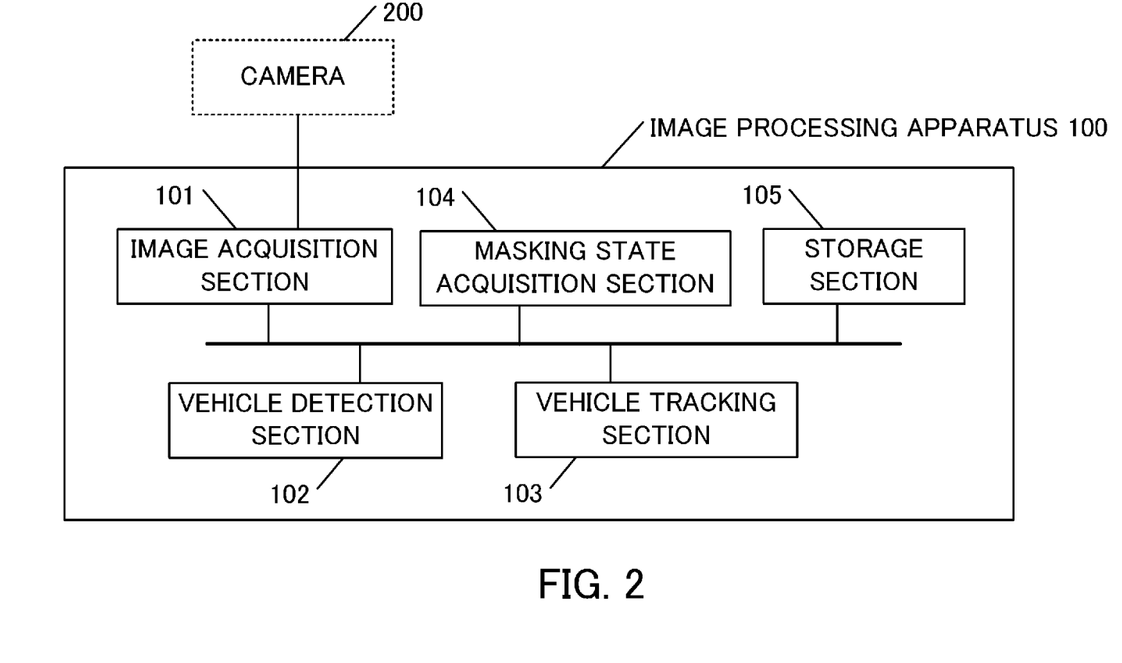
FIG. 2 is a configuration diagram of the image processing system according to the first embodiment.

FIG. 2 is a system configuration diagram of the image processing system according to the present embodiment.

The image processing apparatus 100 includes an image acquisition section 101, a vehicle detection section 102, a vehicle tracking section 103, a masking state acquisition section 104, and a storage section 105.

The image acquisition section 101 is a unit configured to acquire an image (hereinafter referred to as a road image) that includes a vehicle traveling on a road by using the camera 200 mounted on the road. The image acquisition section 101 can acquire the road images consecutively at a predetermined frame rate. The road images acquired by the image acquisition section 101 are stored in the storage section 105 chronologically, and are used in processes performed by the individual units described later.

Note that, in the description of the embodiments, the term "frame" is used to mean one of the road images that are consecutively acquired, but the frame is equivalent to the road image. In addition, in consecutive frames, the appearance of a new vehicle (a vehicle that is not yet tracked) from outside an imaging area is referred to as flowing in, and the movement of a vehicle that is being tracked out of the imaging area is referred to as flowing out.

The vehicle detection section 102 is a unit configured to detect that a new vehicle that is not currently tracked flows in the imaging area of the camera 200. The detection of the new vehicle can be performed by using a plurality of feature amounts pre-stored in the storage section 105. The feature amount may be any feature amount that allows the detection of the vehicle. For example, the feature amount that differs according to a vehicle type or a vehicle shape (a passenger car, a truck, a bus, a motorcycle and the like) may be used. In the case where a plurality of the feature amounts are used, the feature amounts may be classified arbitrarily. Further, the feature amount in the case where the vehicle is viewed in a different direction (the front, rear, left, right and the like) may be retained for each direction.

The vehicle detection section 102 is a unit configured to detect the appearance of the new vehicle that is not tracked, and tracking of the vehicle in subsequent frames is performed by the vehicle tracking section 103.

Note that, in the present embodiment, it is assumed that the vehicle is tracked in the entire imaging area of the camera 200, but the area in which the vehicle is tracked may be determined separately.

The vehicle tracking section 103 is a unit configured to track the movement of the vehicle detected by the vehicle detection section 102 between a plurality of the frames. The tracking is continued until the vehicle flows out of the imaging area. The tracking of the vehicle is performed by using two types of pieces of data of a template image corresponding to a target vehicle to be tracked (hereinafter referred to as a tracking target vehicle) and a masking map generated by the masking state acquisition section 104 described later. The specific details of processes for generating the template image and the masking map will be described later.

The masking state acquisition section 104 is a unit configured to acquire the masking state of the tracking target vehicle and generate the masking map.

Figure 3:
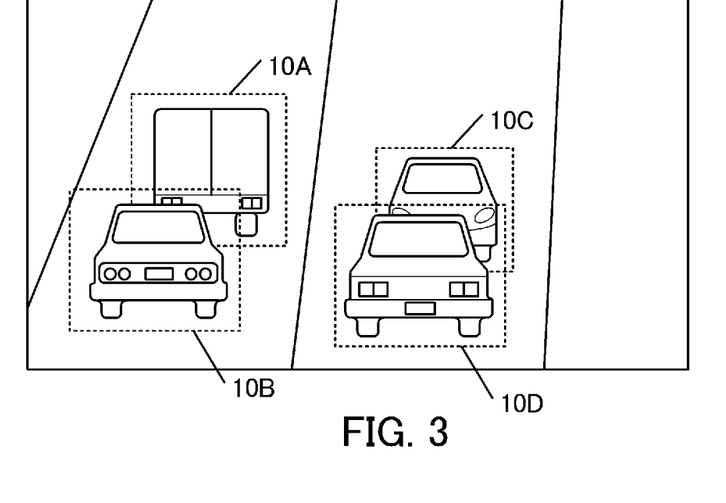
FIG. 3 is an example of an image acquired by an image acquisition section.

Herein, the masking state and the masking map will be described. FIG. 3 is an example of the road image captured by the camera 200. The image processing system according to the present embodiment is the system for tracking the vehicle of which the video is shot by the camera installed on a road, and hence the tracking target vehicle is masked by a vehicle in front or behind in many cases.

For example, in the example in FIG. 3, vehicles 10A and 10C are masked by following vehicles. In such a case, when a conventionally used method such as template matching is used, there is a possibility that an accurate position cannot be detected. In particular, in the case of the vehicle 10C, almost half of the corresponding area is masked, and hence a score in matching is reduced and tracking can be interrupted accordingly.

To cope with this, in the image processing apparatus according to the present embodiment, the masking state acquisition section 104 generates the masking map indicative of the degree of masking by another object (vehicle) for each tracking target vehicle, and template matching is performed after weighting is performed based on the masking map. A specific generation method of the masking map and a use method of the masking map will be described later.

The storage section 105 is a unit configured to temporarily or permanently store data that is used by the apparatus. As the storage section 105, it is preferable to use a storage medium that is capable of high-speed read and write and has a large capacity. For example, a flash memory or the like can be suitably used. The storage section 105 temporarily or permanently stores the feature amount used by the vehicle detection section 102, a plurality of images acquired by the image acquisition section 101, the template image used by the vehicle tracking section 103, and the masking map generated by the masking state acquisition section 104.

Note that the image acquisition section 101, the vehicle detection section 102, the vehicle tracking section 103, and the masking state acquisition section 104 may be implemented by exclusively designed hardware, or may also be implemented by a software module. In the case where they are executed as software, a program stored in an auxiliary storage apparatus is loaded into a main storage apparatus and the program is executed by a CPU, and each unit thereby functions (the CPU, the auxiliary storage apparatus, and the main storage apparatus are not shown).

<Masking Map>

Figure 4A:
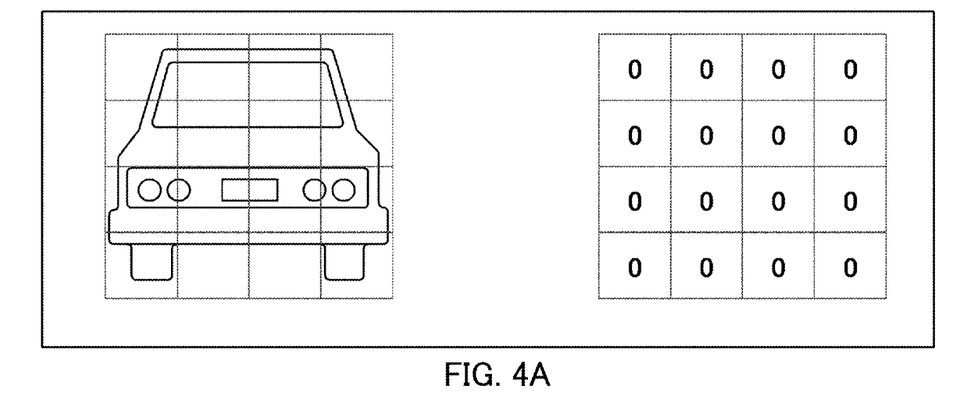
FIGS. 4A and 4B are views for explaining masking of a preceding vehicle by a following vehicle, and a masking map.
Figure 4B:
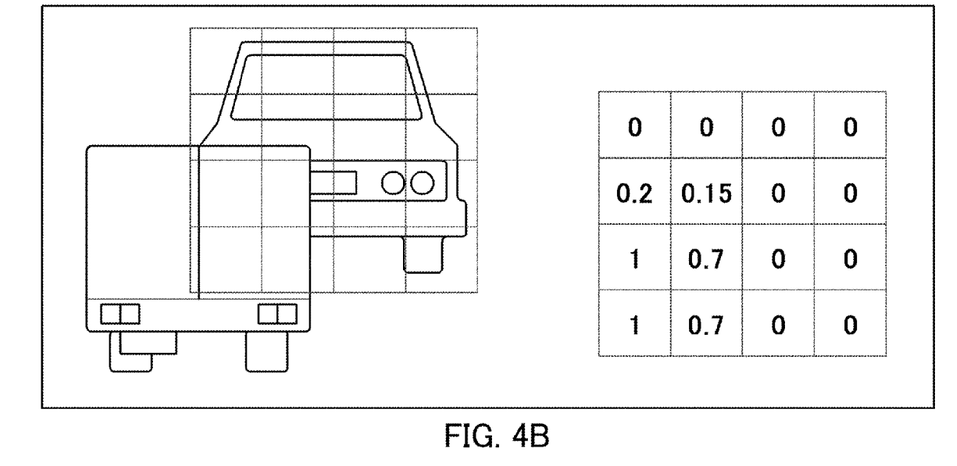

Next, the details of the masking map generated by the masking state acquisition section 104 will be described. FIGS. 4A and 4B are views showing the masking state of the tracking target vehicle and the corresponding masking map.

The masking map is the map in which an area corresponding to the tracking target vehicle is divided into 16 blocks (4×4), and a value indicative of the degree of masking (masking degree) is assigned to each block. Note that the masking degree is represented by real numbers that include 1 indicative of a state in which the tracking target vehicle is completely masked and 0 indicative of a state in which the tracking target vehicle is not masked at all.

FIG. 4A is an example of the state in which the tracking target vehicle is not masked. In this case, 0 is assigned to each block in the masking map. FIG. 4B is an example of the state in which part of the tracking target vehicle is masked by a following vehicle. In this case, values of not less than 0 are assigned to 6 blocks at the lower left.

The image processing apparatus according to the present embodiment generates the above masking map for each tracking target vehicle and for each frame, and performs template matching after performing weighting based on the assigned value. That is, a smaller weight is assigned to the masked block, and a larger weight is assigned to the block that is not masked. With this, it is possible to detect the position of the tracking target vehicle while eliminating an effect of masking.

The specific generation method of the masking map will be described later. In the present example, the masking degree is the real number ranging from 0 to 1, but the masking degree may also be the real number other than the above real number. In addition, the masking degree does not necessarily range from 0 to 1. For example, the masking degree may be an integer ranging from 0 to 255.

<Process Flowchart>

Figure 5:
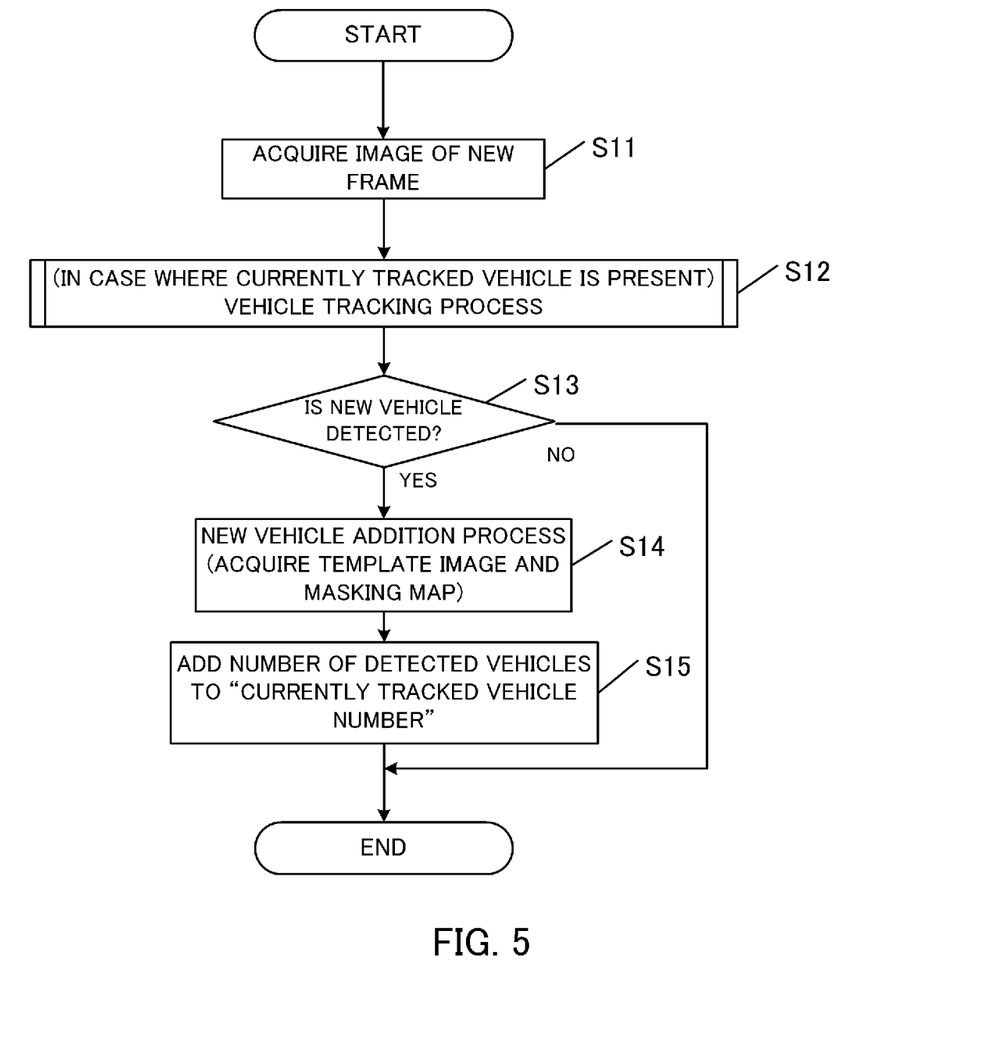
FIG. 5 is a flowchart of processing performed by an image processing apparatus according to the first embodiment.

Next, the details of image processing performed by the image processing apparatus 100 will be described with reference to FIG. 5 serving as a process flowchart. Processing shown in FIG. 5 is executed every time the image acquisition section 101 acquires a new frame. For example, in the case where the frame rate is 10 fps, the processing is executed 10 times per second.

First, in Step S11, the image acquisition section 101 acquires the road image via the camera 200, and causes the storage section 105 to store the road image temporarily. Note that the acquired road image is stored chronologically, and is deleted when the processing is completed.

Next, in Step S12, the vehicle tracking section 13 determines whether or not a currently tracked vehicle is present and, in the case where the currently tracked vehicle is present, the vehicle tracking section 13 executes a process for tracking the tracking target vehicle. It is determined whether or not the currently tracked vehicle is present by using a counter described later. Note that the description will be made on the assumption that the currently tracked vehicle is not present, and the details of Step S12 will be described later with reference to FIG. 7.

In Step S13, the vehicle detection section 102 determines whether or not the vehicle that is not currently tracked is present on the image acquired in Step S11. Specifically, the vehicle detection section 102 performs the detection of the vehicle based on the feature amount pre-stored in the storage section 105. In the detection of the vehicle in the present step, it is possible to use a known object detection method based on the feature amount. For example, matching is performed by using a plurality of stored feature amounts, and an initial position and an area are determined. Note that, in the case where the detected vehicle is the currently tracked vehicle, the vehicle is skipped. Information on the currently tracked vehicle is shared by the vehicle detection section 102 and the vehicle tracking section 103 via the storage section 105.

Figure 6A:
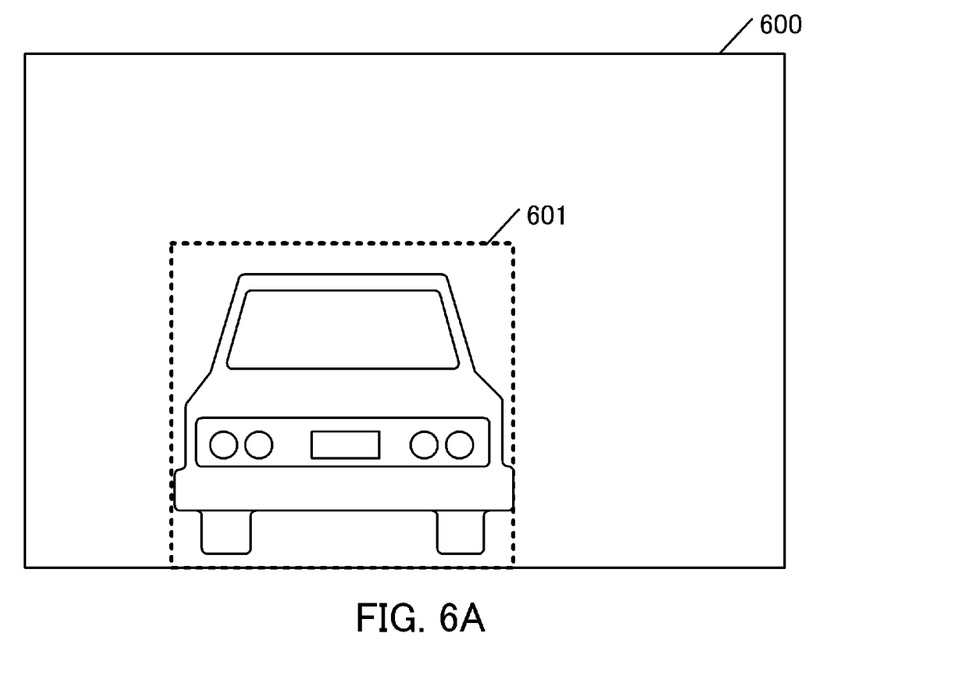
FIGS. 6A and 6B are views for explaining a vehicle detection process.

Herein, it is assumed that a new vehicle is detected in an image 600 shown in FIG. 6A.

When the new vehicle is detected, the processing transitions to Step S14. In the case where the new vehicle is not detected, the processing performed on the frame is ended.

Figure 6B:
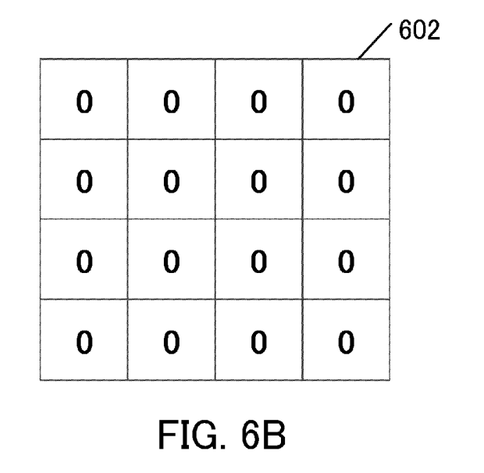

When the vehicle is detected, in Step S14, the vehicle detection section 102 clips the corresponding area, and uses the area as a template image 601. The template image generated herein is used in the tracking of the vehicle in subsequent frames. The template image 601 is associated with a vehicle identifier (numbered every time the vehicle is detected), and the area on the image in which the vehicle is detected, and is stored in the storage section 105. In addition, the vehicle detection section 102 generates a masking map 602 corresponding to the tracking target vehicle. The masking map generated herein is the map in which a default value (the masking degree: 0) is set in each block, as shown in FIG. 6B.

Next, in Step S15, the vehicle detection section 102 adds the number of detected vehicles to the number of currently tracked vehicles (hereinafter referred to as a currently tracked vehicle number). The number of vehicles set herein is used in a vehicle tracking process executed in Step S12.

Figure 7:
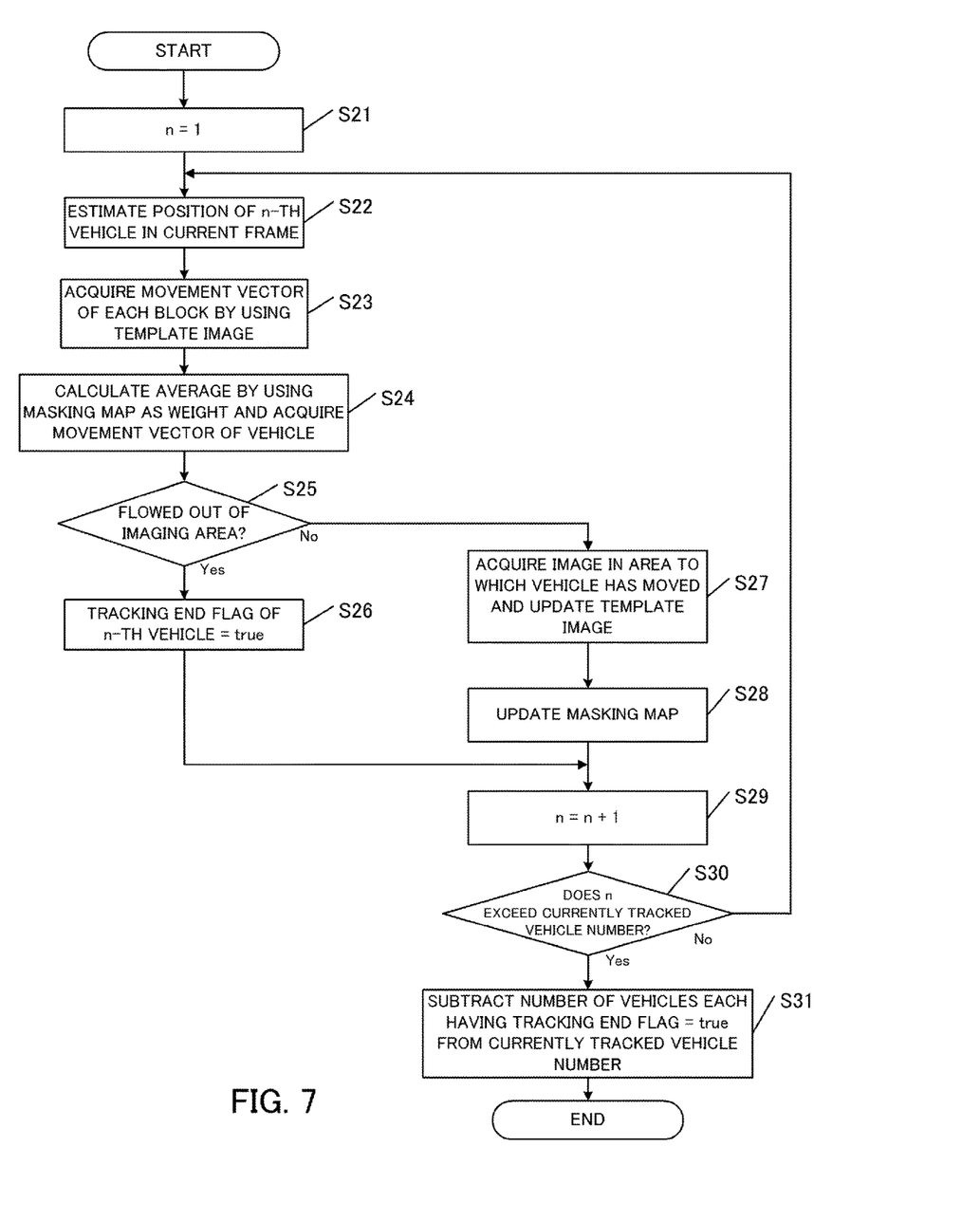
FIG. 7 is a flowchart of the processing performed by the image processing apparatus according to the first embodiment.

Next, the process performed in Step S12 will be described with reference to a flowchart shown in FIG. 7. Note that it is assumed that each step is executed by the vehicle tracking section 103 unless otherwise specified.

The process in Step S12 is executed in the case where the set "currently tracked vehicle number" is not less than one. That is, at a timing when Step S12 is executed, two or more frames are chronologically stored in the storage section 105.

First, in Step S21, a counter n is set to 1. n is the counter for sequentially performing the process on the tracking target vehicles included in the image.

Next, in Step S22, the rough position of the n-th vehicle included in the image in the current frame is estimated. The present step is a process for narrowing an area for performing template matching from the entire area of the image. For example, in the case where the change of the position of the n-th vehicle is determined in two or more previous frames, the position in the current frame may be estimated based on the change of the position. For example, the change of the position of the target vehicle from the position thereof in the second previous frame to the position thereof in the previous frame may be acquired, and the position of the target vehicle in the current frame may be estimated by using the change. In addition, the position of the vehicle may also be estimated by using a Kalman filter or the like.

Note that, in the case where sufficient information for performing the estimation is not provided, it may be presumed that the target vehicle is positioned in the vicinity of the position detected in Step S13 or in the immediately previous frame, or the narrowing may be omitted.

Next, in Step S23, template matching is performed on the road image by using the template image corresponding to the n-th vehicle.

Note that, in this step, the template image is divided into 16 blocks arranged in a 4×4 matrix, and the matching is performed on each block in the vicinity of the position estimated in Step S22. As a result, since 16 matching results are obtained, a movement vector $v_{block\ (x,\ y)}$ (x and y are coordinates) is generated for each of 16 blocks based on the change of the position from that in the previous frame.

Figure 8A:
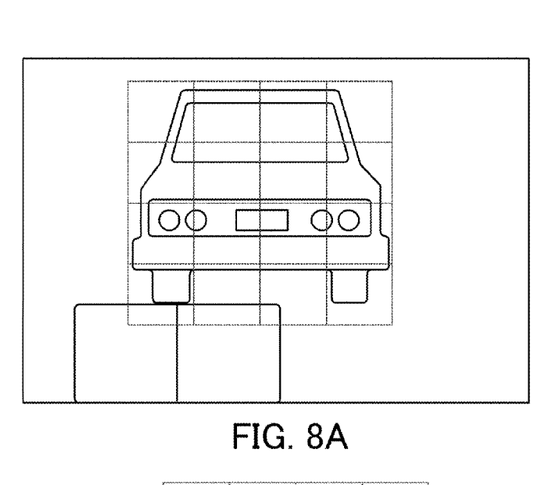
FIGS. 8A to 8C are views for explaining a vehicle tracking process.
Figure 8B:
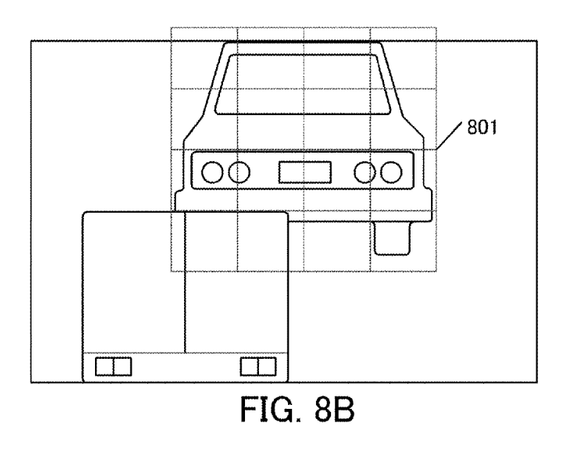
Figure 8C:
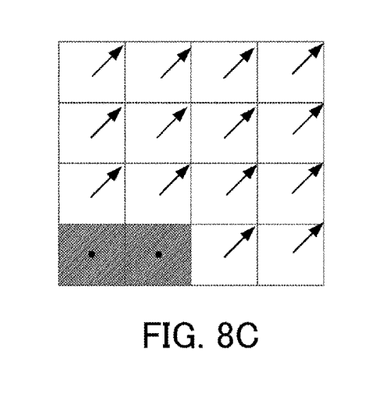

FIG. 8A is a view showing a frame immediately prior to a currently processed frame, and FIG. 8B is a view showing the currently processed frame. In addition, FIG. 8C is a view showing the movement vector of each block between the above frames. Note that two hatched blocks are blocks of which the movement vectors are not obtained correctly due to masking. In each of the two blocks, the movement vector is set to 0.

When the process in Step S23 is completed, the movement vector of each block between the immediately prior frame and the current frame is acquired.

In Step S24, a single movement vector corresponding to the vehicle is acquired based on the movement vector of each block acquired in Step S23 and the masking map.

Specifically, from among 16 movement vectors, an outlier, i.e., a vector having a value that significantly deviates from those of the other vectors is excluded first. For example, a vector having a value that deviates from the average or the mode by 20% or more is excluded.

Next, the weighting based on the masking map is performed on each of the remaining movement vectors. Specifically, the weight is calculated by using a decreasing function of the masking degree. It is possible to use, e.g., a function (1−x). That is, 1 is calculated as the weight in the case where the masking degree is 0, 0 is calculated as the weight in the case where the masking degree is 1, and the movement vector is multiplied by the weight.

The masking map used herein is the map indicative of the masking state of the tracking target vehicle in the previous frame. In the initial process, the masking map is set to a default state (i.e., each masking degree is 0), and hence the movement vector does not change.

Lastly, the average of a plurality of the movement vectors is calculated, and the average is used as the single movement vector v corresponding to the tracking target vehicle.

Note that the above acquisition method of the single movement vector is not limited the method that is described above as an example. For example, the movement vector corresponding to the block having the largest weight may be used as the single movement vector corresponding to the vehicle, and the average of the movement vectors of the blocks each having the weight of larger than a predetermined threshold value may also be used as the single movement vector corresponding to the vehicle.

In Step S25, it is determined whether or not the tracking target vehicle has flowed out of the imaging area. Note that, in the case where a tracking area is set on the image, the determination may be affirmative in the case where the tracking target vehicle has flowed out of the area. In addition, the determination may also be affirmative in the case where the tracking has resulted in failure or has resulted in failure consecutively the number of times equal to the predetermined number of frames. In the case where it is determined that the tracking target vehicle has flowed out of the imaging area, a tracking end flag of the n-th vehicle is set to true, and the process transitions to Step S29.

In the case where the tracking target vehicle is in the imaging area, an area to which the vehicle has moved is clipped, and the area is set as a new template image (Step S27). In the case of an example in FIGS. 8A to 8C, an image corresponding to an area 801 is reset as the template image. When the area is clipped, the size of the area may be equal to that in the previous frame, or may be appropriately adjusted. In the case where the size of the area is adjusted, a method in which the area is enlarged or reduced based on a predetermined coefficient, and a method in which the size thereof is enlarged or reduced based on detected change of a distance between blocks are available.

Next, in Step S28, the masking state acquisition section 104 updates the masking map.

Specifically, a difference (represented by $\Delta P_{(x, y)}$) between the movement vector v corresponding to the vehicle and each of the 16 movement vectors $v_{block\ (x, y)}$ is acquired, and a value ($k|\Delta P_{(x, y)}|$) obtained by multiplying the absolute value of $\Delta P_{(x, y)}$ by a constant k is added to each of current values set in the masking map. That is, the masking degree of each block of the masking map is $0+k|\Delta P_{(x, y)}|$ in the initial process.

In the case of the example in FIGS. 8A to 8C, two blocks at the lower left are masked by the following vehicle, and hence only the two blocks at the lower left are updated with the masking degrees higher than those of the other blocks.

Note that, in the case where it is determined that the masking has disappeared, a process for setting the masking degree assigned to each block back to 0 is performed. For example, in the case where (1) the masking degree is not less than a predetermined value and (2) $|\Delta P_{(x, y)}|$ is not more than a predetermined value, it may be determined that the masking has disappeared. It will be easily understood that other methods may also be adopted.

With this, the tracking process performed on the n-th vehicle is ended.

The counter n is incremented in Step S29, and it is determined whether or not the counter n exceeds the currently tracked vehicle number in Step S30. As a result, in the case where the counter n does not exceed the currently tracked vehicle number, the process returns to Step S22, and the tracking of the next vehicle is started. In the case where the counter n exceeds the currently tracked vehicle number, the number of vehicles of which the tracking is ended (the number of vehicles of which the tracking end flags are set to true) is subtracted from the currently tracked vehicle number (Step S31).

Note that the updated masking map is used in the weighting in the process in the next frame.

In addition, the masking map is updated at any time as the processing of the frame progresses. With this, it is possible to use the masking map obtained when the i-th frame is processed in the processing of the i+1-th frame. With this, it is possible to reflect the masking state that ceaselessly changes with the passage of time at any time. That is, even in the case where the masking occurs dynamically in consecutive frames, it is possible to appropriately update the masking map.

Note that the present embodiment describes the example in which the updated masking map is used in the weighting in the process in the next frame, but the updated masking map does not necessarily need to be used in the process in the next frame. That is, the target frame may be changed appropriately within a range in which the effects of the invention are obtained.

For example, the masking map updated in the i-th frame may be used in the processing of the i+2-th frame. In addition, for example, after the masking map is configured to be updated every 10 frames, the masking map updated in the i-th frame may be used in the processing of the i+1-th to i+10-th frames.

As described above, the image processing apparatus according to the present embodiment generates the masking map based on the result of the comparison between the movement vector acquired for each block and the movement vector corresponding to the entire vehicle, and performs the weighting when matching is performed by using the masking map. It is not possible to positively eliminate the effect of the masking in template matching in conventional arts, but the image processing apparatus according to the present embodiment can perform the matching while reducing the effect of the block that exerts an adverse effect by performing the weighting described above. That is, it is possible to improve accuracy in the tracking of the vehicle.

Second Embodiment

A second embodiment is an embodiment in which the masking degree is corrected based on the strength of an edge on the image.

In the second embodiment, in the process in Step S28, the strength of an edge present in a direction perpendicular to the traveling direction of the vehicle is extracted, a coefficient proportional to the strength of the edge is calculated, and the masking degree is multiplied by the coefficient. For example, a Sobel filter that extracts the edge present in the direction perpendicular to the traveling direction of the vehicle (a horizontal axis direction in the example in FIGS. 8A to 8C) is applied to the acquired image, and the sum of absolute values of all obtained values is acquired. Subsequently, the masking degree in the masking map is multiplied by a coefficient determined by using a relation shown in FIG. 9.

Figure 9:
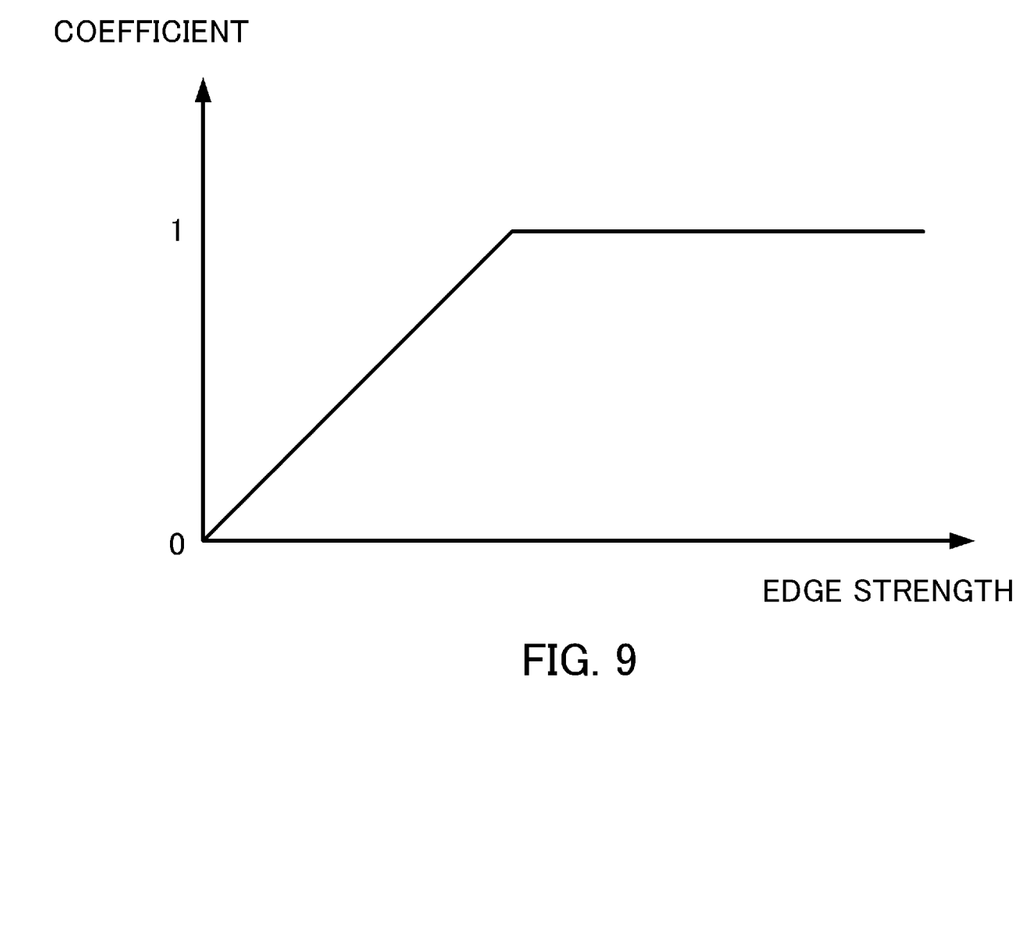
FIG. 9 is a view for explaining the strength of an edge in a second embodiment.

In the case where the masking does not occur, the vehicle traveling in a specific direction in the image has a characteristic that an edge occurs in a direction orthogonal to the traveling direction. In the second embodiment, it becomes possible to calculate the masking degree more accurately by using the characteristic.

Note that the traveling direction of the vehicle may be defined in advance, and may also be dynamically set according to a detection result by providing a detection unit. For example, learning may be performed based on the previous tracking result, and the traveling direction of the vehicle may be estimated accordingly.

Modification

Each of the above-described embodiments is only exemplary, and the present invention can be appropriately modified and implemented without departing from the gist thereof.

For example, in the description of the embodiments, the tracking target vehicle is divided into 16 blocks and the process is performed, but the division method may be the method other than the above method. As the number of blocks is increased, the accuracy is improved, but process time is increased, and hence the number of blocks and the size of the block may be appropriately set based on required specifications.

In addition, in the description of the embodiments, the masking map is generated by determining the difference between the movement vector corresponding to the vehicle and each of the 16 movement vectors, but the calculation method of the masking degree is not limited to the method described as the example as long as the masking degree can be determined by the method.

Further, in the description of the embodiments, the example in which the vehicle is tracked by processing a plurality of consecutively acquired frames one by one is described, but the frames do not necessarily need to be processed one by one. For example, it is also possible to thin out the frames and process every other frame.

REFERENCE SIGNS

100 Image processing apparatus
101 Image acquisition section
102 Vehicle detection section
103 Vehicle tracking section
104 Masking state acquisition section
105 Storage section
200 Camera

The invention claimed is:

1. An image processing apparatus for tracking a target object to be tracked included in a plurality of consecutively captured images,
the image processing apparatus comprising:
a processor configured to perform operations comprising operations as:
an image acquisition unit configured to acquire an image;
a template acquisition unit configured to acquire a template corresponding to a target object to be tracked included in the image;
a masking map generation unit configured to generate a masking map serving as a map indicative of a degree of masking the target object to be tracked, which is included in the image, by another object; and
a tracking unit configured to detect the target object to be tracked included in the image by using the template, and acquire over a plurality of images an amount of movement of the target object to be tracked and a direction of the movement of the target object to be tracked, based on both of the template and the masking map, wherein:
the masking map comprises a map in which the template is divided into a plurality of blocks and the degree of masking is associated with each of the blocks; and
the processor is configured to perform operations such that operation as the tracking unit comprises operation as the tracking unit that acquires the amount of the movement of the target object to be tracked and the direction of the movement of the target object to be tracked based on a result of matching performed by using the template on a per block basis and weighting performed by using the degree of masking corresponding to each of the blocks.

2. The image processing apparatus according to claim 1, wherein
the processor is configured to perform operations such that operation as the masking map generation unit comprises operation as the masking map generation unit that generates the masking map, based on a result of a comparison between a single vector, obtained by tracking the target object to be tracked over the plurality of images, and each of a plurality of vectors obtained by tracking the plurality of blocks over the plurality of images.

3. The image processing apparatus according to claim 2, wherein
the processor is configured to perform operations such that operation as the masking map generation unit comprises operation as the masking map generation unit that sets the degree of masking a corresponding block to a higher degree of masking as a difference between the single vector and each of the plurality of vectors resulting from the comparison between the single vector and each of the plurality of vectors is larger, and
the processor is configured to perform operations such that operation as the tracking unit comprises operation as the tracking unit that sets, as the degree of masking corresponding to a block is higher, a weight of the block to a smaller weight.

4. The image processing apparatus according to claim 1, wherein
the processor is configured to perform operations such that operation as the masking map generation unit comprises operation as the masking map generation unit that updates the masking map every time the tracking unit generates a tracking result, and
the processor is configured to perform operations such that operation as the tracking unit comprises operation as the tracking unit that uses the updated masking map in a process of detecting the target object to be tracked in a next frame.

5. The image processing apparatus according to claim 1, wherein
the degree of masking set in the masking map is lower as an edge perpendicular to the movement direction of the target object to be tracked in a corresponding block is stronger.

6. The image processing apparatus according to claim 1, wherein
the processor is configured to perform operations such that operation as the template acquisition unit comprises operation as the template acquisition unit that uses an image obtained by clipping the target object to be tracked, which has been detected by the tracking unit, as the template in a next frame.

7. An image processing method performed by an image processing apparatus for tracking a target object to be tracked included in a plurality of consecutively captured images,
the image processing method comprising:
acquiring an image;
acquiring a template corresponding to a target object to be tracked included in the image;

generating a masking map serving as a map indicative of a degree of masking the target object to be tracked, which is included in the image, by another object; and detecting the target object to be tracked included in the image by using the template and acquiring over a plurality of the images an amount of movement of the target object to be tracked and a direction of the movement of the target object to be tracked, based on both of the template and the masking map, wherein:

the masking map comprises a map in which the template is divided into a plurality of blocks and the degree of masking is associated with each of the blocks; and the method further comprises acquiring the amount of movement of the target object to be tracked and the direction of the movement of the target object to be tracked based on a result of matching performed by using the template on a per block basis and weighting performed by using the degree of masking corresponding to each of the blocks.

8. A non-transitory computer readable storage medium storing a computer program for causing a computer in an image processing apparatus for tracking a target object to be tracked included in a plurality of consecutively captured images to perform an image processing method comprising:

acquiring an image;

acquiring a template corresponding to a target object to be tracked included in the image;

generating a masking map serving as a map indicative of a degree of masking the target object to be tracked, which is included in the image, by another object; and detecting the target object to be tracked included in the image by using the template and acquiring over a plurality of the images an amount of movement of the target object to be tracked and a direction of the movement of the target object to be tracked, based on both of the template and the masking map, wherein:

the masking map comprises a map in which the template is divided into a plurality of blocks and the degree of masking is associated with each of the blocks; and the method further comprises acquiring the amount of movement of the target object to be tracked and the direction of the movement of the target object to be tracked based on a result of matching performed by using the template on a per block basis and weighting performed by using the degree of masking corresponding to each of the blocks.

* * * * *